(12) United States Patent
Isono et al.

(10) Patent No.: US 9,336,810 B2
(45) Date of Patent: May 10, 2016

(54) METHOD FOR MANUFACTURING GLASS BLANK FOR MAGNETIC DISK, METHOD FOR MANUFACTURING GLASS SUBSTRATE FOR MAGNETIC DISK

(75) Inventors: Hideki Isono, Kofu (JP); Hidekazu Tanino, Akishima (JP); Akira Murakami, Akiruno (JP); Takashi Sato, Inagi (JP); Masamune Sato, Kodaira (JP); Masaru Onishi, Kufu (JP)

(73) Assignee: HOYA CORPORATION, Tokyo (JP)

( * ) Notice: Subject to any disclaimer, the term of this patent is extended or adjusted under 35 U.S.C. 154(b) by 164 days.

(21) Appl. No.: 13/982,877

(22) PCT Filed: Apr. 27, 2012

(86) PCT No.: PCT/JP2012/002940
§ 371 (c)(1),
(2), (4) Date: Oct. 15, 2013

(87) PCT Pub. No.: WO2012/147371
PCT Pub. Date: Nov. 1, 2012

(65) Prior Publication Data
US 2014/0033768 A1   Feb. 6, 2014

(30) Foreign Application Priority Data
Apr. 27, 2011  (JP) ................. 2011-100022

(51) Int. Cl.
*C03B 11/12* (2006.01)
*G11B 5/84* (2006.01)
*C03B 11/08* (2006.01)

(52) U.S. Cl.
CPC ............ *G11B 5/8404* (2013.01); *C03B 11/088* (2013.01); *C03B 11/122* (2013.01); *C03B 11/125* (2013.01); *C03B 2215/07* (2013.01); *C03B 2215/70* (2013.01)

(58) Field of Classification Search
USPC ........................................... 65/90

IPC .................................... G11B 5/84; C03B 11/12
See application file for complete search history.

(56) References Cited

U.S. PATENT DOCUMENTS

2005/0204777 A1    9/2005   Mori et al.

FOREIGN PATENT DOCUMENTS

| JP | 07-133121 A | 5/1995 |
| JP | 09-268021 A | 10/1997 |
| JP | 2000-281362 A | 10/2000 |
| JP | 2003-313037 A | 11/2003 |
| JP | 2008-007400 A | 1/2008 |
| JP | 2005-263574 | 9/2009 |
| JP | 2009-269762 A | 11/2009 |
| JP | 2010-280514 A | 12/2010 |

OTHER PUBLICATIONS

"Cutting Glass", The Scientific Glassblowing Learning Center, 2011.
Written Opinion dated Oct. 9, 2014 in the counterpart Singapore patent application.
International Search Report of corresponding International Application No. PCT/JP2012/002940, dated on Jul. 31, 2012.

*Primary Examiner* — Mark Halpern
(74) *Attorney, Agent, or Firm* — Global IP Counselors, LLP

(57) ABSTRACT

A method for manufacturing a glass substrate for magnetic disk is provided in which a glass is kept from being fused to a mold during press forming and shape processing to achieve a good circularity is efficiently performed. The method includes: a forming process of forming a disk-shaped glass blank by direct-pressing a molten glass by a pair of dies; and a shape processing process of performing at least one of inner hole formation and outer shape formation for forming a disk-shaped glass substrate by forming a cutting line on the principal face of the glass blank, followed by growing the cutting line to perform cutting. In the forming process, press forming is performed while the temperature of the pair of dies, over a period of time until a molten glass is separated from the die after coming into contact with the die, is set at a temperature lower than a glass transition point (Tg) and a mold release material is not attached to the surfaces of the pair of dies.

6 Claims, 9 Drawing Sheets

METHOD FOR MANUFACTURING GLASS BLANK FOR MAGNETIC DISK, METHOD FOR MANUFACTURING GLASS SUBSTRATE FOR MAGNETIC DISK

CROSS-REFERENCE TO RELATED APPLICATIONS

This U.S. National stage application claims priority under 35 U.S.C. §119(a) to Japanese Patent Application No. 2011-100022, filed in Japan on Apr. 27, 2011, the entire contents of Japanese Patent Application No. 2011-100022 are hereby incorporated herein by reference.

BACKGROUND

1. Field of the Invention

The present invention relates to a method for manufacturing a glass blank for magnetic disk and a method for manufacturing a glass substrate for magnetic disk.

2. Background Information

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die. In the vertical direct press method, a period of time until the lump of molten glass (molten glass lump) is pressed after being supplied to the lower die is long, and therefore when the surface roughness of the lower die is improved, the molten glass lump is fused to the lower die (i.e. a state in which the lower die is in contact with the molten glass lump at a high temperature for a long time in a cumulative manner occurs, and the surface thereof is oxidized, so that the glass is seized). Accordingly, in the vertical direct press method, generally it is necessary that a mold release material such as, for example, BN (boron nitride) be attached to the lower die beforehand for preventing a situation in which the molten glass lump is fused to the lower die and cannot be removed. In this way, the mold release characteristic of the glass blank is secured. However, the surface of the glass blank obtained by press forming is projected because particles of the mold release material are attached thereto. Thus, even though the surface roughness of the forming surface of the die is improved, the surface roughness of the glass blank obtained is large owing to the attached particles of the mold release material.

After press forming, a shape processing process of cutting a glass blank along two concentric circles is performed for forming the glass blank obtained by press forming into a disk-shaped glass substrate. For shape processing, a method using a core drill or a method by scribing is employed. Generally, the method by scribing is better in terms of circularity and/or concentricity, but in the case where the surface roughness of the glass blank is large, the blade may be bounded, and the glass blank may be broken when cutting is performed because a cutting line may not be formed as a continuous circular line. That is, in the case where the surface roughness of the glass blank is large, the yield of scribing is reduced, and therefore the method by scribing cannot be employed in a mass production process. Therefore, in the case where the surface roughness of the glass blank is large, the method using a core drill is employed; however, a circularity and/or concentricity which is as high as that of scribing cannot be achieved due to fluctuations in circularity and rotation axis of the drill. Accordingly, the vertical direct press method, in which a glass blank having a large surface roughness is formed owing to attached particles of the mold release material, has a limitation in enhancing outer shape accuracy such as circularity while securing a high yield. In the vertical direct press method, pressing can be performed without attaching the mold release material to the upper die, and it is conceivable that a cutting line for scribing is formed in a surface formed in the upper die, but since particles of the mold release material are attached on a surface formed in the lower die, circularity and/or concentricity is deteriorated as well when the glass blank is completely cut.

From the viewpoint described above, Japanese Patent Laid-open Publication No. 2009-269762 discloses that a die in vertical direct press is formed so that a glass blank after pressing includes first and second cutting regions (regions to be cut by scribing) having a center line average roughness Ra of 0.1 to 50 nm in a concentric-circle shape, and other regions having a center line average roughness Ra of 100 nm or more.

Consequently, cutting lines for shape processing in first and second regions can be stably formed, so that a cut surface having defects such as chipping reduced can be formed, and the mold release characteristic of the glass blank during press forming is secured by means of regions having a center line average roughness Ra of 100 nm or more (relatively rough regions). Generally, for performing shape processing, a method using a core drill in place of a scribe cutter is also employed, but use of the scribe cutter allows shape processing of a circular shape having a higher circularity.

SUMMARY

A die used in vertical direct press method does not control a contour of a molten glass drawn by pressing, and therefore a glass blank obtained by pressing has a low circularity. Thus, the central position of the cutting lime of a scribe cutter cannot be determined based on the outer shape of the glass blank. Accordingly, in the press forming method described in Patent Document 1, a mechanism is required for determining the central position of the cutting line of the scribe cutter from first and second cutting regions (two concentric-circle-shaped regions) formed on the glass blank. When controlling a contour of a molten glass drawn by pressing in the die used in vertical direct press, there is the problem that the molten glass easily causes the die to be seized.

In the press forming method described in Patent Document 1, regions of the forming surface other than those corresponding to first and second regions must be increased for easiness in releasing the mold, and the most part of the principal face of the press-formed glass blank has a large surface roughness. Therefore, the machining allowance in subsequent grinding and polishing processes is increased, leading to not only an increase in tact time but also occurrence of cracking.

Accordingly, an object of the present invention is to provide a method for manufacturing a glass substrate for magnetic disc, which is capable of shape-processing a press-formed glass blank into a disc shape with good accuracy while securing a high yield without grinding or polishing the principal face of the glass blank.

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming dies) arranged so as to face each other in a direction orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

Further the present inventors have conceived that in the novel press forming method described above, the molten glass lump is prevented from being fused to the die by performing press forming while controlling the temperature of the die so that the temperature of the die, over a period of time until the molten glass lump is separated from the die after coming into contact with the die, is equal to or lower than a glass transition point (Tg). That is, it has been found that in the novel press forming method described above, the molten glass lump can be prevented from being fused to the die by performing the above-described temperature control, owing also to the molten glass being not in contact with at least one of the dies for a long time. Accordingly, the surface roughness of the die can be decreased since it is not necessary for a mold release material to be attached with the die for preventing from being fused. Consequently, the surface roughness of the glass blank obtained by the press forming can be decreased.

From the viewpoint described above, the present invention may be a method for manufacturing a glass substrate for magnetic disk, which includes: a forming process of forming a disk-shaped glass blank by direct-pressing a molten glass by a pair of dies; and a shape processing process of performing at least one of inner hole formation and outer shape formation for forming a disk-shaped glass substrate by forming a cutting line on the principal face of the glass blank, followed by growing the cutting line to perform cutting, wherein in the forming process, press forming is performed while the temperature of the pair of dies, over a period of time until a molten glass is separated from the die after coming into contact with the die, is set at a temperature lower than a glass transition point (Tg) and a mold release material is not attached to the surfaces of the pair of dies.

In the method for manufacturing a glass substrate for magnetic disk, preferably the arithmetic mean roughness (Ra) of the contact surface that is in contact with the molten glass in the pair of dies may be 0.5 μm or less.

In the forming process, the falling lump of molten glass may be press-formed in a direction orthogonal to the falling direction using a pair of dies.

In the forming process, press forming may be performed so that the temperature of a portion of the die, which contacts the molten glass, is identical between the pair of dies.

In the shape processing process, an inner hole formation and an outer shape formation may be performed at the same time.

In the shape processing process, a pressing force applied to a cutting line for the outer shape formation is made higher than a pressing force applied to a cutting line for the inner hole formation.

DETAILED DESCRIPTION OF EMBODIMENTS

A method for manufacturing a glass blank for magnetic disk and a method for manufacturing a glass substrate for magnetic disk in this embodiment will be described in detail below.

[Glass Substrate for Magnetic Disk]

Figure 1:
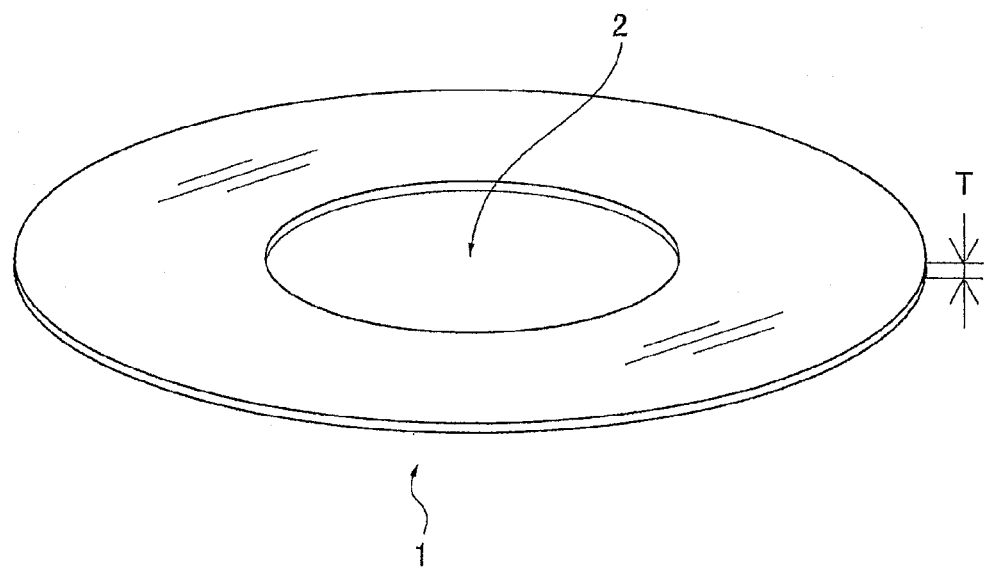
FIG. 1 is a perspective view illustrating an external shape of a glass substrate for magnetic disk of an embodiment.

As illustrated in FIG. 1, a glass substrate for magnetic disk 1 in this embodiment is a disk-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole (inner hole) 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 µm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared. Furthermore, the above described glass material may be preferably amorphous glass for obtaining extremely low surface roughness. Accordingly, the above described glass material may be preferably amorphous aluminosilicate glass from a view point of both strength and low surface roughness.

The composition of the glass substrate for magnetic disk of this embodiment is not limited, but the glass substrate of this embodiment is preferably made of amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion expressed in mol %.

The glass substrate according to the present embodiment may be made of amorphous aluminosilicate glass having the following composition.

Glass material including, as a glass composition expressed in mol %,
56 to 75% of $SiO_2$,
1 to 11% of $Al_2O_3$,
more than 0% and 4% or less of $Li_2O$,
1% or more and less than 15% of $Na_2O$, and
0% or more and less than 3% of $K_2O$, and is substantially free of BaO;
a total content of alkali metal oxides selected from the group consisting of $Li_2O$, $Na_2O$, and $K_2O$ is in a range of 6 to 15%,
a molar ratio of a content of $Li_2O$ to a content of $Na_2O$ ($Li_2O/Na_2O$) is less than 0.50;
a molar ratio of a content of $K_2O$ to the total content of the alkali metal oxides $\{K_2O/(Li_2O+Na_2O+K_2O)\}$ is 0.13 or less;
a total content of alkaline-earth metal oxides selected from the group consisting of MgO, CaO, and SrO is in a range of 10 to 30%;
a total content of MgO and CaO is in a range of 10 to 30%;
a molar ratio of the total content of MgO and CaO to the total content of the alkaline-earth metal oxides $\{(MgO+CaO)/(MgO+CaO+SrO)\}$ is 0.86 or more;
a total content of the alkali metal oxides and the alkaline-earth metal oxides is in a range of 20 to 40%;
a molar ratio of a total content of MgO, CaO, and $Li_2O$ to the total content of the alkali metal oxides and the alkaline-earth metal oxides $\{(MgO+CaO+Li_2O)/(Li_2O+Na_2O+K_2O+MgO+CaO+SrO)\}$ is 0.50 or more;
a total content of oxides selected from the group consisting of $ZrO_2$, $TiO_2$, $Y_2O_3$, $La_2O_3$, $Gd_2O_3$, $Nb_2O_5$, and $Ta_2O_5$ is more than 0% and 10% or less; and
a molar ratio of the total content of the oxides to a content of $Al_2O_3$ $\{(ZrO_2+TiO_2+Y_2O_3+La_2O_3+Gd_2O_3+Nb_2O_5+Ta_2O_5)/Al_2O_3\}$ is 0.40 or more.

The glass substrate according to the present embodiment may be amorphous aluminosilicate glass having the following composition.

Glass material including, as a glass composition expressed in mol %,
50 to 75% of $SiO_2$,
0 to 5% of $Al_2O_3$,
0 to 3% of $Li_2O$,
0 to 5% of ZnO,
3 to 15% in total of $Na_2O$ and $K_2O$,
14 to 35% in total of MgO, CaO, SrO, and BaO, and
2 to 9% in total of $ZrO_2$, $TiO_2$, $La_2O_3$, $Y_2O_3$, $Yb_2O_3$ $Ta_2O_5$, $Nb_2O_5$ and $HfO_2$,
a molar ratio $[(MgO+CaO)/(MgO+CaO+SrO+BaO)]$ is in a range of 0.8 to 1, and
a molar ratio $[Al_2O_3/(MgO+CaO)]$ is in a range of 0 to 0.30.

[Method for Manufacturing Glass Substrate for Magnetic Disk of Embodiment]

Figure 2:
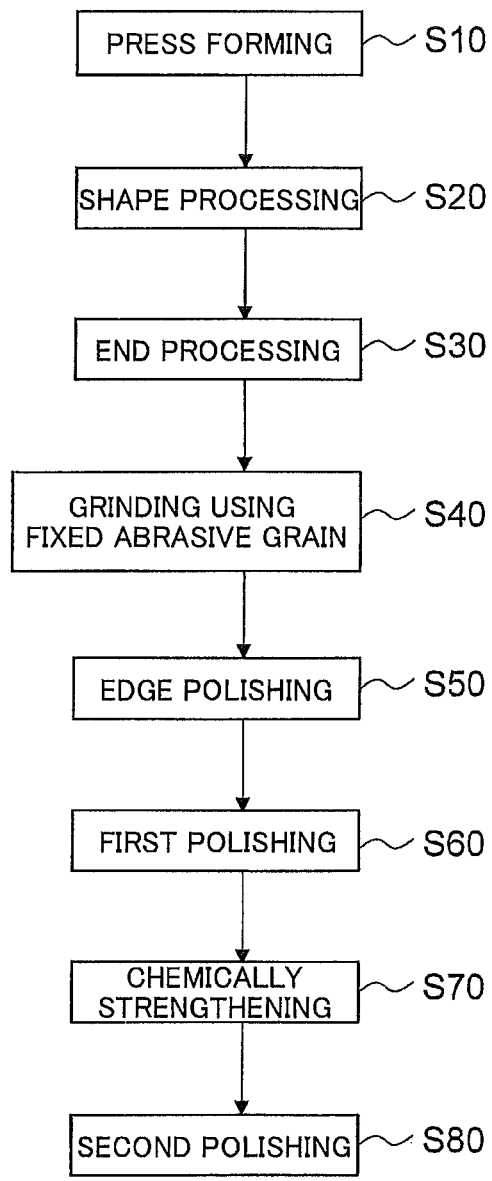
FIG. 2 is a view illustrating a flow of one embodiment of a method for manufacturing the glass substrate for magnetic disk of the embodiment.

Next, a flow of a method for manufacturing a glass substrate for magnetic disk will be described with reference to FIG. 2. FIG. 2 is a view illustrating a flow of one embodiment of a method for manufacturing a glass substrate for magnetic disk.

As illustrated in FIG. 2, in the method for manufacturing a glass substrate for magnetic disk in this embodiment, first a disk-shaped glass blank is prepared by press forming (Step S10). Next, the formed glass blank is scribed to prepare a disk-shaped glass substrate (Step S20). Next, the scribed glass substrate is subjected to shape processing (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 3:
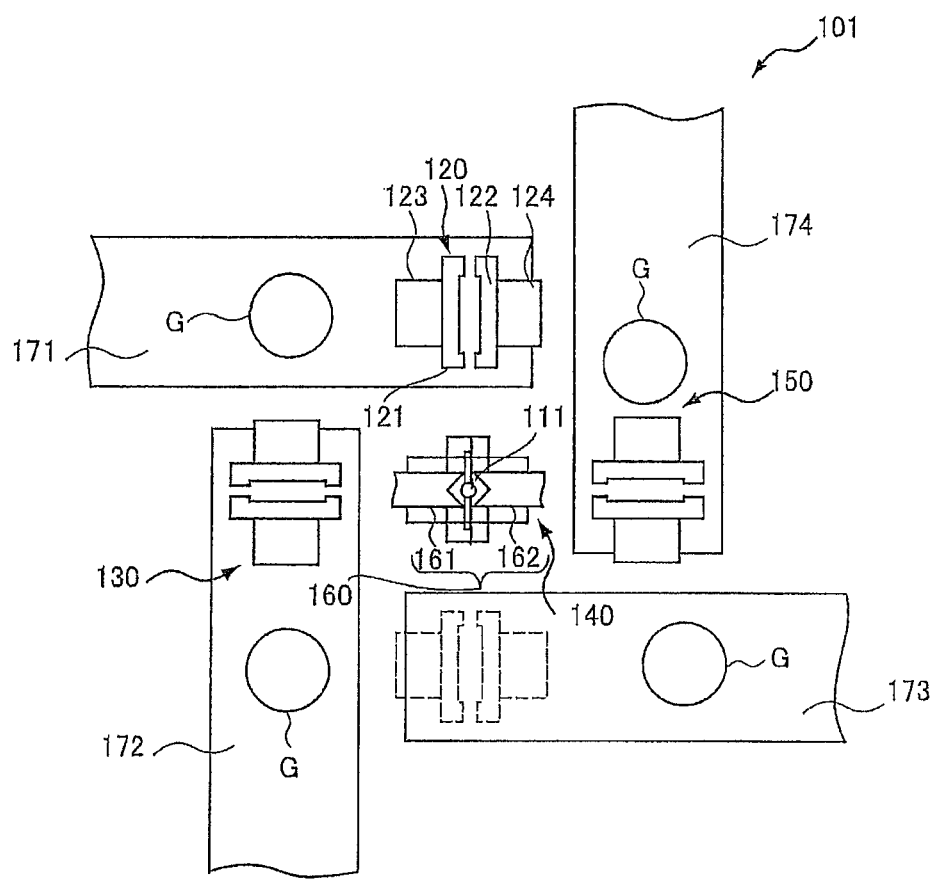
FIG. 3 is a plan view of an apparatus used in press forming of the embodiment.

First, the press forming process will be described with reference to FIG. 3. FIG. 3 is a plan view of an apparatus used in press forming. As illustrated in FIG. 3, an apparatus 101 includes four sets of press units 120, 130, 140 and 150, a cutting unit 160 and a cutting blade 165 (not illustrated in FIG. 2). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 4:
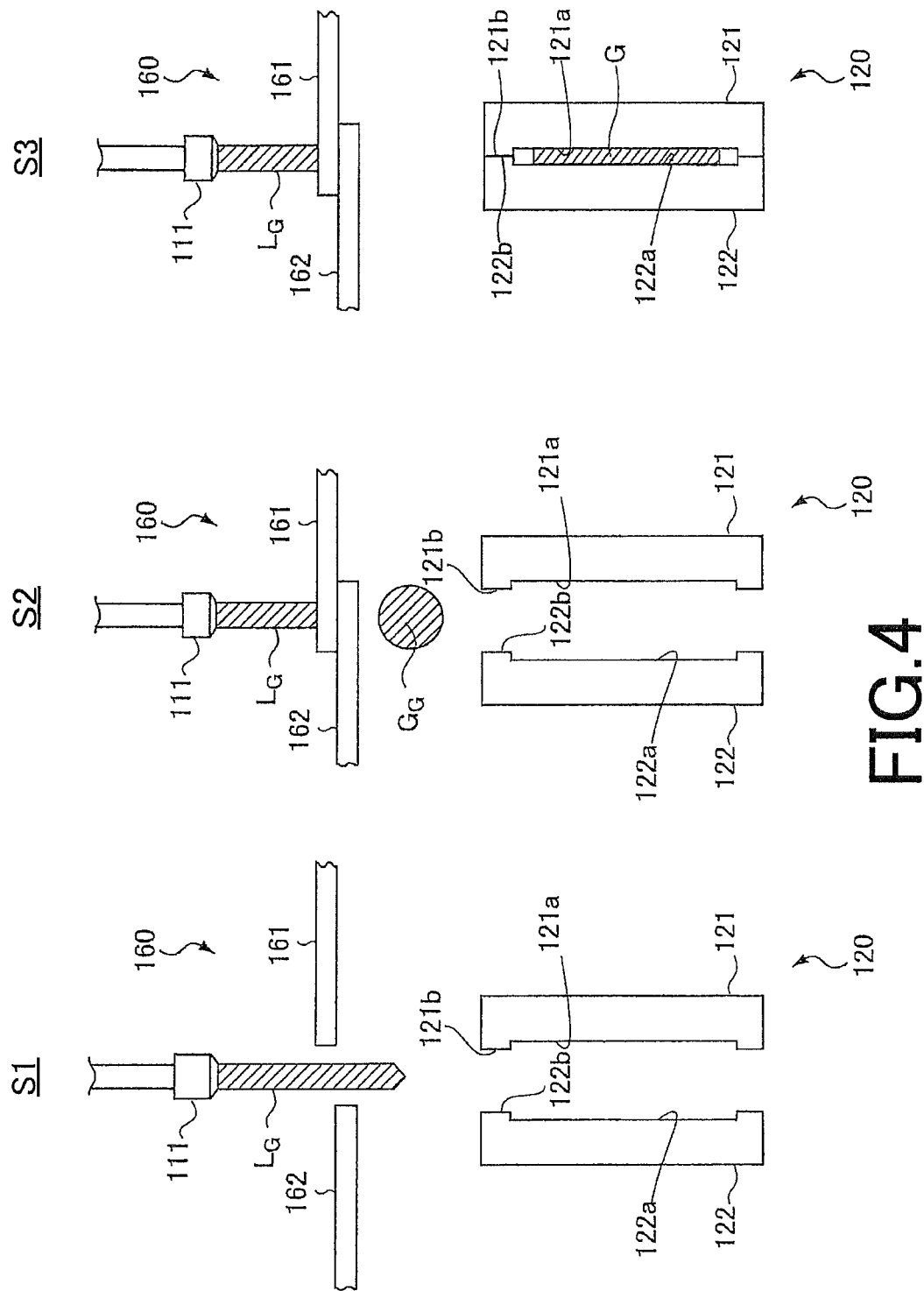
FIG. 4 is a view illustrating an example of press forming of the embodiment.

Specifically, as illustrated in FIG. 4, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 3) is located immediately below the molten glass outflow port 111. The retreat position (positions in which the press units 120, 130, and 150 are drawn by solid lines and a position in which the press units 140 is drawn by a broken line in FIG. 3) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 4 to S3 of FIG. 4 more specifically illustrates press forming performed by the apparatus 101. S1 of FIG. 4 is a view illustrating the state before the gob is made, S2 of FIG. 4 is a view illustrating the state in which the gob is made by the cutting unit 160, and S3 of FIG. 4 is a view illustrating the state in which the glass blank G is formed by pressing the gob.

As illustrated in S1 of FIG. 4, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 4). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in S3 of FIG. 4, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 4, the gob stretched by closed dies does not reach projections 121b and 122b of the dies.

The temperatures of the first die 121 and second die 122 are retained sufficiently lower than the glass transition temperature $T_G$ of the molten glass $L_G$. It is not necessary to attach a mold release material to the first die 121 and the second die 122 in the press forming process.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of $30\times10^{-7}$ to $100\times10^{-7}(K^{-1})$, preferably in a range of $50\times10^{-7}$ to $100\times10^{-7}(K^{-1})$. Even more preferably, the thermal expansion coefficient is $80\times10^{-7}(K^{-1})$ or more. The thermal expansion coefficient is a value calculated using the linear expansion coefficients of the glass substrate for magnetic disk at temperatures of 100° C. and 300° C. A thermal expansion coefficient of, for example, less than $30\times10^{-7}(K^{-1})$ or more than $100\times10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

Glass having a viscosity in a wide range may be subjected to a press forming since horizontal pressing is utilized in this embodiment. Glass having a high viscosity may be preferably applied. This is because glass is pressed while falling down vertically and better circularity may be therefore obtained with glass having a relatively high viscosity. Specifically, the viscosity may be preferably 500 poise or more. It should be noted that the viscosity of 2,000 poise or more is not preferable due to difficulty in making a thin sheet.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness (arithmetic mean roughness Ra) of the contact surface that is in contact with the gob $G_G$ in the inner circumferential surface 121a and the inner circumferential surface 122a is adjusted to be preferably 0.5 μm, further preferably 0.0005 to 0.05 μm. The surface roughness of the glass blank G may be uniform on the principal face.

The press forming method in this embodiment is preferable in that flatness of the formed glass blank G is good and grinding processing may be therefore omitted. Further, according to the press forming method in this embodiment, since surface roughness of the formed glass blank G is decreased, machining allowance in the grinding processing may be reduced. This is preferable in terms of productivity or prevention of shear drops of an end surface. In addition, it is further preferable that the flatness and smoothness of the die are made to be the same as those of a target glass substrate for magnetic disk, since at least one polishing processing may be omitted.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 3).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the glass blank G. Accordingly, the flatness of the principal face of the prepared glass blank G is improved as compared to a glass blank prepared by conventional press forming with an upper die and a lower die.

In the example illustrated in FIG. 4, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 5:
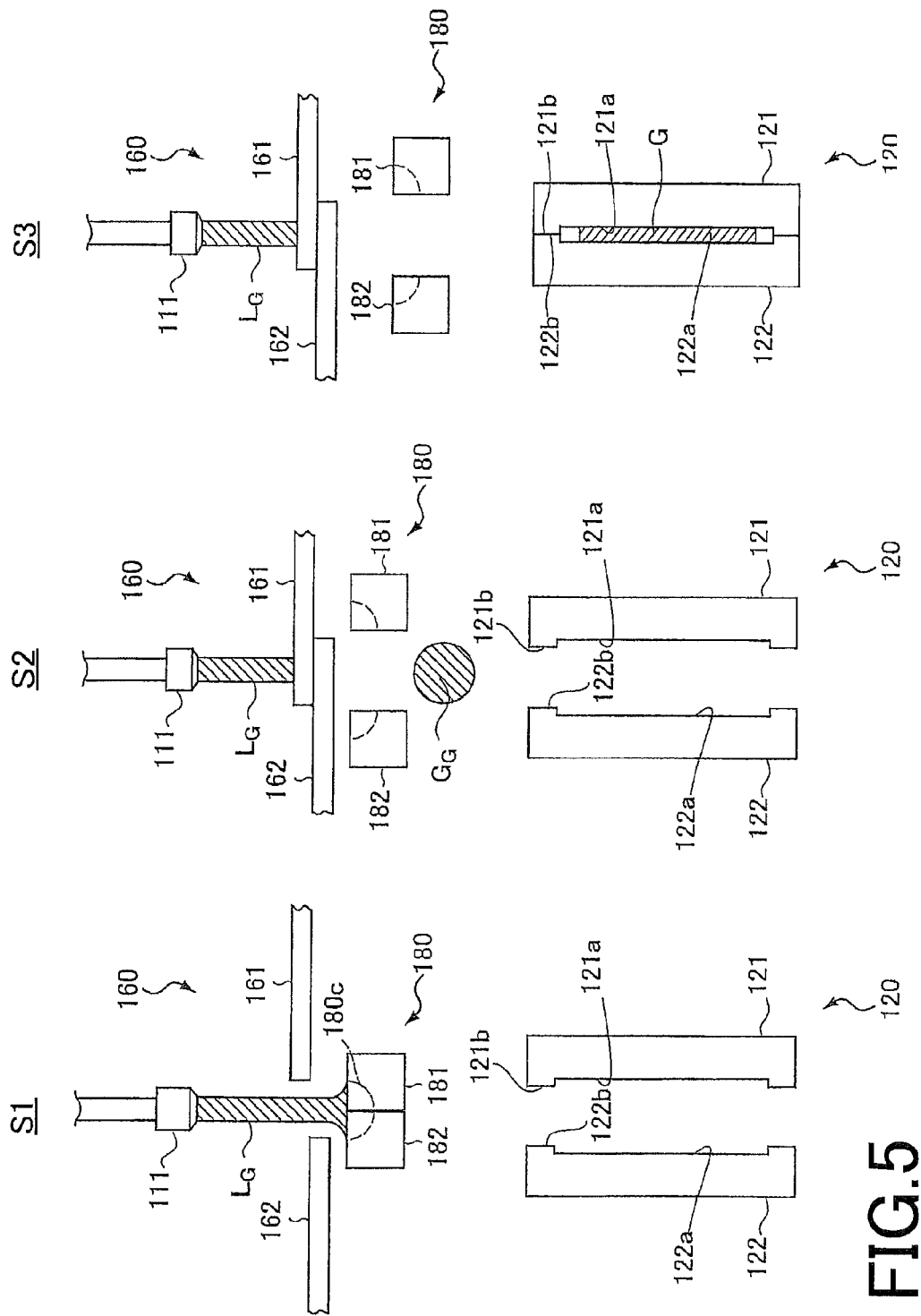
FIG. 5 is a view illustrating a modification of press forming of the embodiment using a gob forming die.

S1 of FIG. 5 to S3 of FIG. 5 are views illustrating a modification of the embodiment of FIG. 4. The gob forming die is used in the modification. S1 of FIG. 5 is a view illustrating the state before the gob is made, S2 of FIG. 5 is a view illustrating the state in which the gob $G_G$ is made by the cutting unit 160 and a gob forming die 180, and S3 of FIG. 5 is a view illustrating the state in which the press forming is performed to the gob $G_G$ to make the glass blank G.

As illustrated in S1 of FIG. 5, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in S2 of FIG. 5, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 5, during the fall of the gob $G_G$, the spherical gob $G_G$ is sandwiched between the first die 121 and the second die 122 to perform the press forming, thereby preparing the disk-shaped glass blank G.

Figure 6:
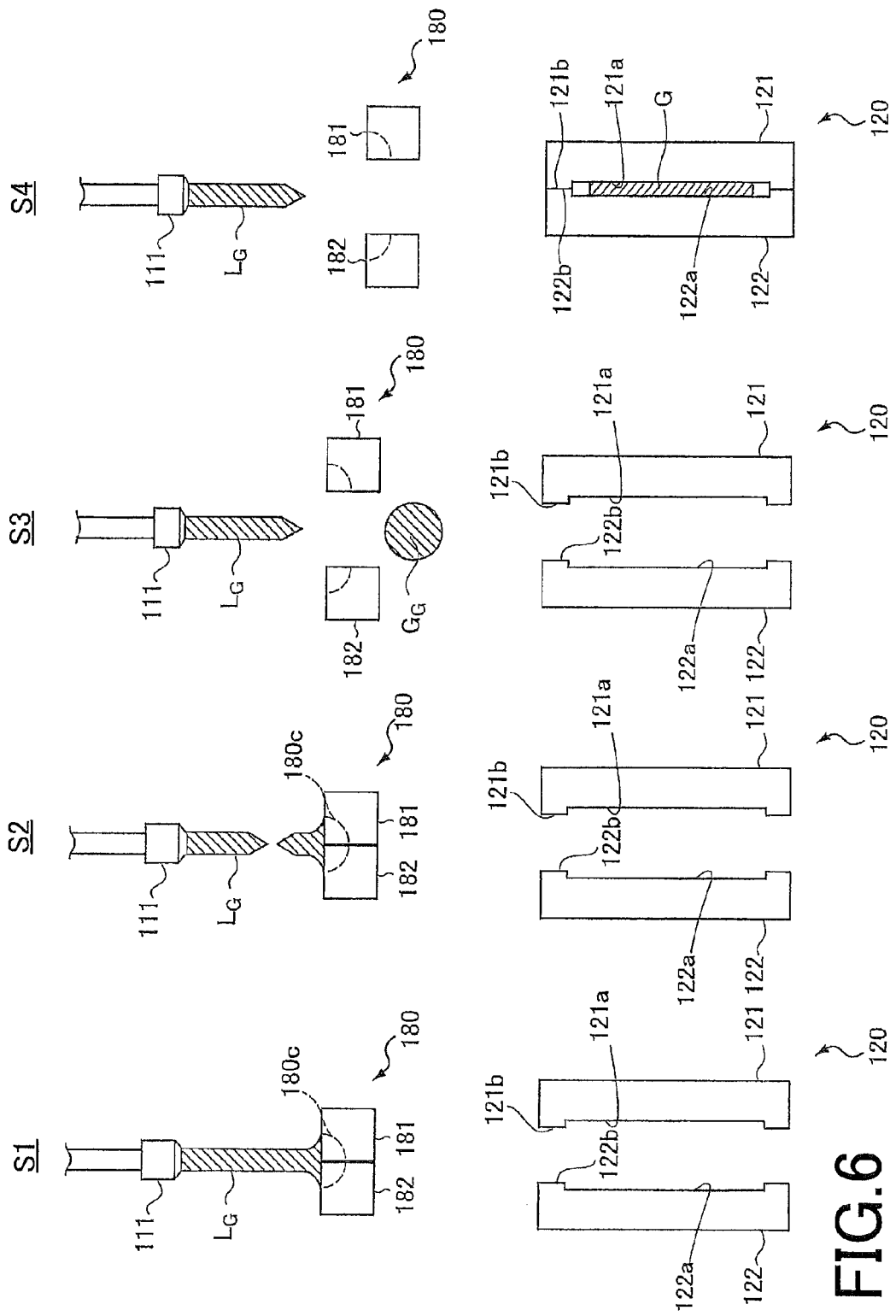
FIG. 6 is a view illustrating a modification of press forming of the embodiment in which a cutting unit is not used.

Alternatively, as illustrated in S1 of FIG. 6 to S4 of FIG. 6, in the apparatus 101, instead of using the cutting unit 160 illustrated in S1 of FIG. 5 to S3 of FIG. 5, a moving mechanism that moves the gob forming die 180 in an upstream direction or a downstream direction along the path of the molten glass $L_G$ may be used. S1 of FIG. 6 to S4 of FIG. 6 are views illustrating a modification in which the gob forming die 180 is used. S1 of FIG. 6 and S2 of FIG. 6 are views illustrating the state before the gob $G_G$ is made, S3 of FIG. 6 is a view illustrating the state in which the gob $G_G$ is made by the gob forming die 180, and S4 of FIG. 6 is a view illustrating the state in which the gob $G_G$ is subjected to press forming to make the glass blank G.

As illustrated in S1 of FIG. 6, the recess 180C formed by the block 181 and 182 receives the molten glass $L_G$ flowing out from the molten glass outflow port 111. As illustrated in S2 of FIG. 6, the blocks 181 and 182 are quickly moved onto the downstream side of the flow of the molten glass $L_G$ at predetermined timing. In this way, the molten glass $L_G$ is cut. Then, as illustrated in S3 of FIG. 6, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 6, during the fall of the gob $G_G$, the spherical gob $G_G$ is sandwiched between the first die 121 and the second die 122 to perform the press forming, thereby preparing the disk-shaped glass blank G.

Figure 7:
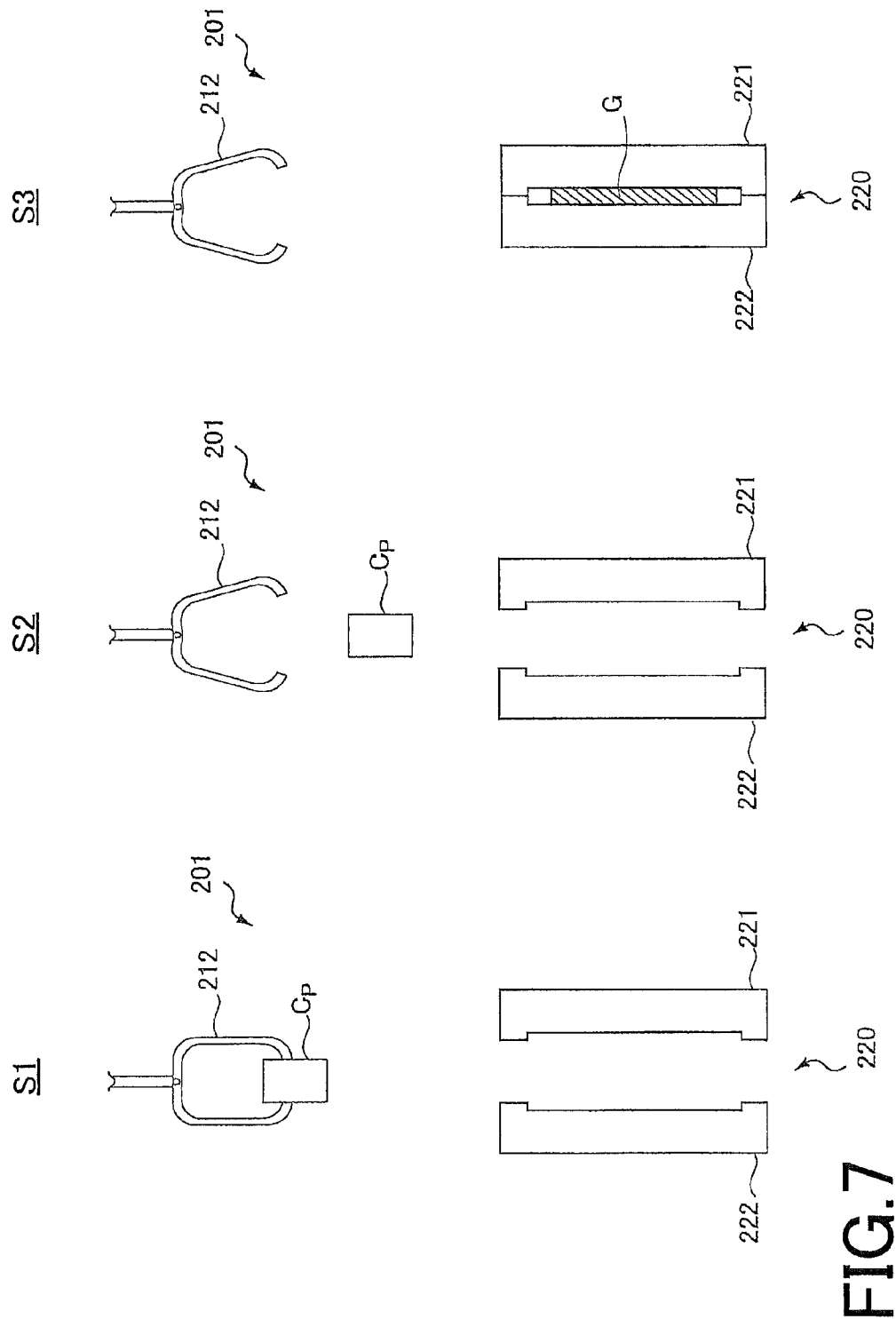
FIG. 7 is a view illustrating a modification of press forming of the embodiment using an optical glass heated by a softening furnace.

S1 of FIG. 7 to S3 of FIG. 7 are views illustrating another modification in which, instead of the gob $G_G$, a lump $C_p$ of the optical glass heated by a softening furnace is caused to fall down and the press forming is performed to the lump $C_P$ while the lump $C_P$ is sandwiched from both sides between dies 221 and 222 during the fall of the lump $C_p$. S1 of FIG. 7 is a view illustrating the state before the lump of the heated optical glass is formed, S2 of FIG. 7 is a view illustrating the state in which the lump of the optical glass falls down, and S3 of FIG. 7 is a view illustrating the state in which the press forming is performed to the lump of the optical glass to make the glass blank G.

As illustrated in S1 of FIG. 7, in an apparatus 201, a glass material grasping mechanism 212 conveys the lump $C_P$ of the optical glass to a position above a press unit 220. As illustrated in S2 of FIG. 7, the glass material grasping mechanism 212 releases the lump $C_P$ of the optical glass to cause the lump $C_P$ of the optical glass to fall down. As illustrated in S3 of FIG. 7, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 5, the descriptions are omitted.

[Temperature Control of Dies]

In the above-described press forming of this embodiment, the temperatures of the first die 121 and the second die 122 are retained sufficiently lower than the glass transition temperature (Tg) of the molten glass $L_G$ before press forming as described previously. Further the temperatures of the first die 121 and the second die 122, over a period of time until the molten glass is separated from the first die 121 and the second die 122 after coming into contact therewith, may be controlled to be lower than the glass transition point (Tg) of the molten glass $L_G$.

It should be noted that temperature of the molten glass is preferably controlled to be consistently lower than that of the first die 121 and the second die 122 in the press forming process. It is more preferable that, in the press forming process, the temperature of the molten glass is less than the glass transition temperature (Tg) and is controlled to be consistently lower than that of the first die 121 and the second die 122.

Here, the temperature of the die is, for example, a temperature as measured using a thermocouple at a point which is located 1 mm to the inside of the die corresponding to the central position of the glass blank in each of the inner circumferential surfaces 121a and 122a of the dies (e.g. the central point of each of the inner circumferential surfaces 121a and 122a).

The temperatures of the first die 121 and the second die 122, over a period of time until the molten glass is separated from the first die 121 and the second die 122 after coming into contact therewith, may be kept lower than the glass transition point (Tg) of the molten glass $L_G$ while the form of the first die 121 and the second die 122 illustrated in FIG. 4 is maintained. Otherwise, a heat exhausting unit may be provided in the die to perform control so that the temperature of the die in the press forming process is lower than the glass transition point (Tg). Specific examples of the temperature control of the dies will be described below with reference of FIGS. 8 and 9.

Figure 8:
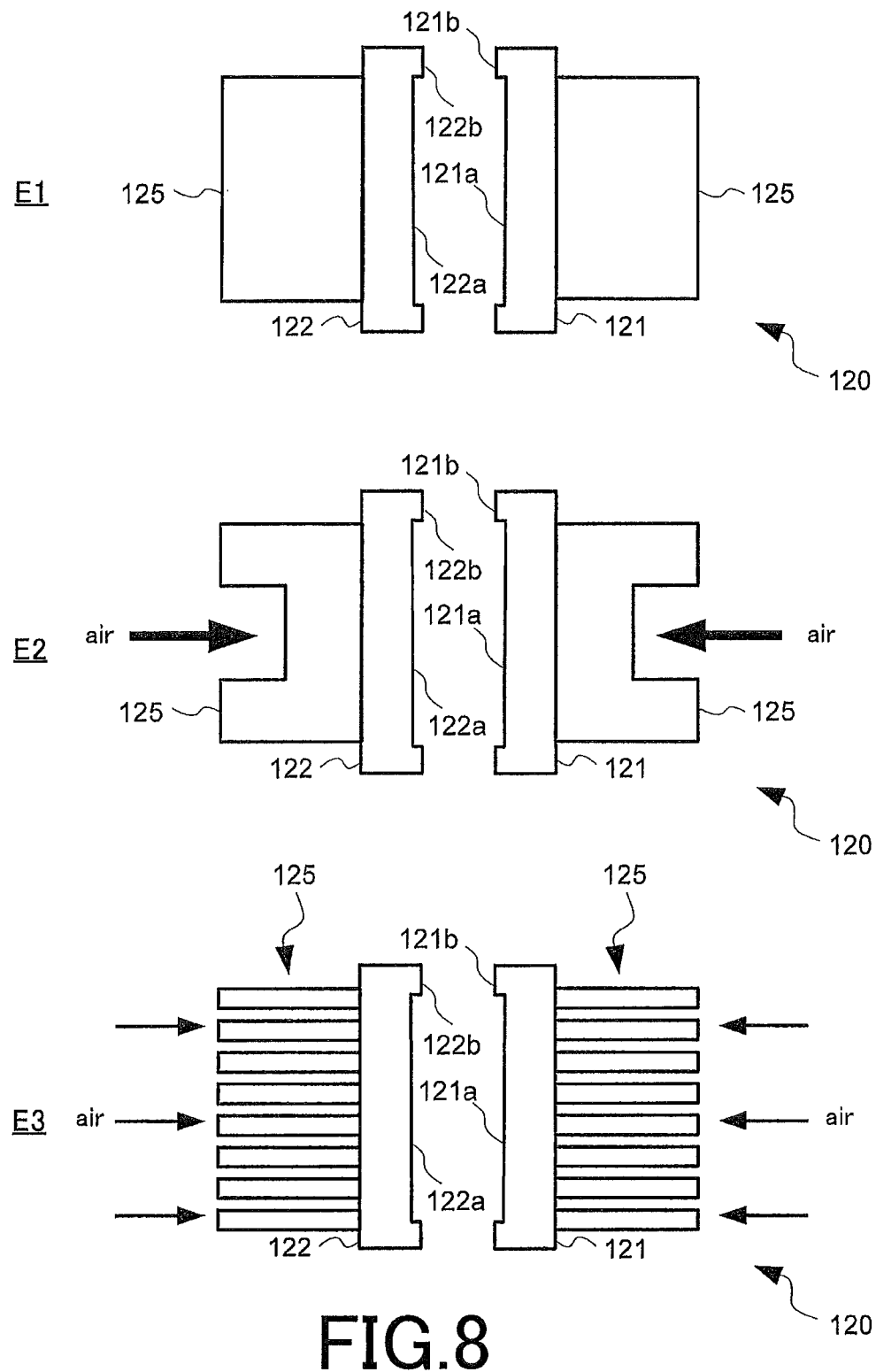
FIG. 8 is a view illustrating an example of a heat exhausting unit used in press forming of the embodiment.

E1 of FIG. 8 to E3 of FIG. 8 each illustrates a heat exhausting unit 125 for decreasing the temperature of each of the first and second dies 121 and 122. The heat exhausting unit 125 is coupled to the die by known fastening means so as to be in surface contact with the outer circumferential surface of each die. The heat exhausting unit 125 is provided for exhausting heat retained by the die to outside.

E1 of FIG. 8 illustrates an example where the heat exhausting unit 125 is provided so as to be in surface contact with almost the whole of the outer circumferential surface of each of the first and second dies 121 and 122. The heat exhausting unit 125 illustrated in E2 of FIG. 8 is formed in a concave shape, and is configured such that heat exchange is efficiently performed by supplying air to the recessed portion at the center thereof by an air supply mechanism (not illustrated). The heat exhausting unit 125 illustrated in E3 of FIG. 8 is in the form of a heat sink including a plurality of fins, and is intended to perform cooling efficiently by securing a large heat exhaust area to outside air. In the case of E3 of FIG. 8, heat exchange can also be efficiently performed by supplying air to an air supply mechanism (not illustrated).

Preferably the heat exhausting unit 125 is formed with material having heat conductivity higher than that of each of first and second dies 121 and 122. For example, when first and second dies 121 and 122 are formed of an ultrahard alloy (e.g. VM40), the heat exhausting unit 125 may be formed of copper, a copper alloy, aluminum, an aluminum alloy or the like. Since the heat exhausting unit 125 has heat conductivity higher than that of each of first and second dies 121 and 122, heat from first and second dies 121 and 122 can be efficiently discharged to outside. The heat conductivity of the ultrahard alloy (VM40) is 71 (W/m·K), and the heat conductivity of copper is 400 (W/m·K). The member that forms the heat exhausting unit 125 may be appropriately selected according to the heat conductivity, hardness, thickness and dimension, etc. of the metal forming first and second dies 121 and 122. First and second dies 121 and 122 are required to have strength capable of sustaining press, and therefore preferably they are not integrated with the heat exhausting unit 125.

Figure 9:
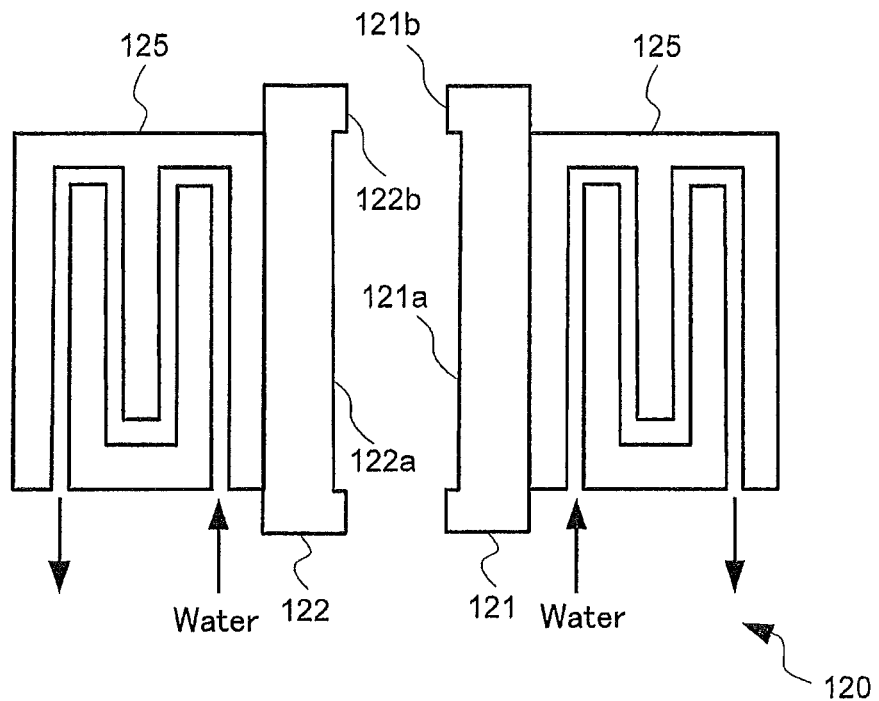
FIG. 9 is a view illustrating an example of a heat exhausting unit (water-cooling) used in press forming of the embodiment.

The heat exhausting unit 125 illustrated in FIG. 9 is one example in which a water-cooling mechanism (not illustrated) is provided. In this case, cooling water is supplied into the heat exhausting unit 125 by, for example, a water-cooling mechanism which may be provided with a cooling water storage tank, a water pump and a pipeline. A passage for cooling water is provided in the heat exhausting unit 125. Cooling water supplied from the water-cooling mechanism passes through the passage for cooling water, and is warmed by absorbing heat transferred to the heat exhausting unit 125 from the die, and discharged from the heat exhausting unit 125 to a tank of the water-cooling mechanism. The temperatures of the first and second dies 121 and 122 can also be decreased with the above-described water-cooling system.

In press forming of this embodiment, the temperatures of the first die 121 and the second die 122, over a period of time until the molten glass is separated from the first die 121 and the second die 122 after coming into contact therewith, are controlled to be lower than the glass transition point (Tg) of the molten glass $L_G$ using means as illustrated in FIGS. 8 and 9. Therefore, in the press forming method of this embodiment, unlike the conventional vertical direct press method, it is not necessary to attach a release material to the surface of the die because the molten glass $L_G$ can be prevented from being fused to the die, even if a die having an inner circumferential surface having an extremely low surface roughness is used, by performing the above-described temperature control of the die, owing also to the molten glass being not in contact with only one of the dies for a long time.

Furthermore, with the heat exhausting unit 125 provided, a difference in temperature (difference in temperature on a press forming surface) between the central portion and the circumferential edge portion on each of the inner circumferential surface 121a of the first die 121 and the inner circumferential surface 122a of the second die 122 may be lowered while the molten glass Lg is press formed. The glass blank G obtained after a press forming may therefore have a good surface waviness.

(b) Scribing Process (Step S20; Shape Processing Process)

Next, the scribing process will be described. After the press forming process, the formed glass blank G is subjected to scribing in the scribing process.

As used herein, the scribing means that two concentric (inside concentric and outside concentric) cutting lines are provided in the surface of the glass blank G with a scriber made of a super alloy or diamond particles in order to obtain the disk-shape (ring-shape) of the formed glass blank having a predetermined size. The glass blank scribed into two concentric-circle-shape is partially heated, and a portion outside the outside concentric circle and a portion inside the inside concentric circle are removed (cut) as the cutting line grows by a difference in thermal expansion of the glass blank. In this scribing, preferably inner hole formation and outer shape formation are performed at the same time by forming two concentric-circle-shaped cutting lines at the same time using a coaxial scriber in that a high circularity is achieved. A disk-shaped glass substrate can also be obtained by forming a circular hole in the glass blank using a core drill or the like.

Japanese Patent Laid-open Publication No. 2009-269762 may be referred to with regard to a scribe cutter having a wheel type structure and also details of a cutting process using a scribe cutter.

In this embodiment, since the arithmetic average roughness Ra of the principal face of the glass blank obtained in the press forming process as a preliminary process is as small as 0.001 to 0.1 μm, and a mold release material is not attached, the glass blank is not broken during or after scribing, and a high yield can be secured in a mass production process. The circularity of the outer shape and/or the central hole of the glass substrate after scribing, or the concentricity thereof is not deteriorated.

Furthermore, in the press forming method of the present embodiment, both principal faces of the glass blank have the same surface roughness. Thus, a crack extends well while cutting, and a break is unlikely to occur.

In a case in which a shear mark (a linear mark occurring on a glass blank due to cut mark when a gob is generated) is generated, the shear mark may be preferably adjusted to be formed in substantially the center of the blank or at an edge of the blank, so that the shear mark does not exist on the glass blank after cutting. That is, the shear mark may be positioned at the inside of the inside concentric circle or at the outside of the outside concentric circle.

With regard to a glass blank formed of glass having high Tg and high linear expansion coefficient in the press forming method of the present embodiment, stress strain may sometimes exist on a surface of a die. Presumably, this is because glass is a low thermal conductive material and also a cooling history of the glass is slightly different for a position of the principal face of the glass blank. When a lump of molten glass is pressed, it is cooled while being extended even for an extremely short time. Thus, cooling history of the inner portion and the outer portion is therefore presumed to be different, because degree of extension for each portion is different. In view of the above, it has been found that, even if pressing while a temperature is controlled to be uniform on a surface of a die and cooling after the pressing are performed, degree of stress strain may be different depending on positions on the principal face of the glass blank. Specifically, stress strain of a portion closer to the outer circumference of the principal face of the glass blank has been found to be greater. Such phenomenon can occur to any glass, but is likely to occur to glass of Tg equal to 620° C. or more. Moreover, the phenomenon is very likely to occur to glass of Tg equal to 650° C. or more. It is inferred that an influence of extension of glass when being pressed becomes relatively large, since the time of change of glass from a molten state to a solid state is shorter as Tg of the glass is higher.

Furthermore, stress strain is more likely to occur as linear expansion coefficient of glass is higher. This is because a deformation amount increases with regard to a temperature change. The stress strain is more likely to occur when the linear expansion coefficient is $50 \times 10^{-7}/°$ C. or more, and is even more likely to occur when the linear expansion coefficient is $70 \times 10^{-7}/°$ C. or more.

In the scribing process of the present embodiment, a pressing force of a cutting line on an OD (outer diameter) side is preferably 1.1 to 1.5 times greater than that on an ID (inner diameter) side. A depth of the cutting line may be controlled by varying the pressing force of the scriber to the ID side and the OD side of the glass blank. Specifically, the depth of the cutting line may be preferably within a range of 0.05 to 0.15 mm for the ID side, and within a range of 0.05 to 0.15 mm for the OD side. That is, the pressing force of the cutting line on the OD side may be preferably greater than that on the ID side, thereby equalizing the depth of the cutting line on both the ID side and the OD side. It should be noted that, a scribe cutter is applied obliquely to the principal face of the glass blank, while the depth of the cutting line is defined as a depth in a thickness direction of the glass blank and is not defined as a depth in the oblique direction. When the depth of the cutting line is 0.05 mm or less, a cutting may be difficult. When the depth of the cutting line is 0.15 mm or more, a break may occur.

According to the present inventors' study, it has been found that, when a glass blank is manufactured by means of a horizontal direct pressing using glass of high Tg and is then scribed, stress strain due to compressive stress is likely to occur on the surface, and therefore there is sometimes a case in which a cutting line becomes shallow. In such the case, compressive stress is the smallest in the vicinity of the center of the glass blank, and becomes larger toward the outer circumference. Thus, a scribed depth at the outer circumferential side is constantly shallow. Accordingly, a pressing force of the scribe at the outer circumference may be set to be greater than that at the inner circumference for allowing a proper pressing force both at the inner and the outer circumference, thereby setting a desired depth of two cutting lines on the inside and outside. As a result, occurrence of a break, and deterioration of circularity and concentricity may be suppressed, and a high yield of scribing may be therefore obtained.

(c) End Processing Process (Step S30)

Next, the end portion processing process will be described. The end portion processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process Using Fixed Abrasive Grain (Step S40)

In the grinding process using a fixed abrasive grain, the principal face of the glass substrate after the end portion processing process is subjected to grinding processing (machining) using a double faces grinding apparatus including a planet gear mechanism. For example, the grinding has the machining allowance of several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground.

In the press forming process of this embodiment, a glass blank having extremely high flatness of, for example, 4 μm or less, can be prepared, and therefore the grinding process may be omitted. Before the grinding process, a lapping process may be performed using a double faces grinding apparatus similar to the apparatus used in the grinding process and an alumina loose abrasive grain.

When the arithmetical mean roughness Ra of the principal face of the glass blank immediately after press forming is 0.1 μm or less, target surface properties of the glass substrate for magnetic disk can be obtained even if the grinding process is omitted.

(e) Edge Polishing Process (Step S50)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and micro-waviness (MW-Rq) of 0.5 nm or less for the principal face of the glass substrate.

The micro-waviness may be represented by a RMS (Rq) value calculated as a roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(g) Chemically Strengthening Process (Step S70)

Next, the glass substrate after the first polishing process is chemically strengthened.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing preferably has the machining allowance of about 1 μm, specifically in a range of 0.5 to 2 μm. If the machining allowance is less than the range, the surface roughness may not be decreased sufficiently. On the other hand, if the machining allowance is greater than the range, the deterioration (such as roll-off) of the edge shape may be caused. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pore water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face may be preferably made to have a roughness (Ra) of 0.15 nm or less, and even more preferably 0.1 nm or less. The principal face may be preferably made to have micro-waviness (MW-Rq) of 0.3 nm or less, and even more preferably 0.1 nm or less.

As described above, the method for manufacturing a glass blank for magnetic disk in this embodiment includes a press forming process of direct press-forming a lump of molten glass using a pair of dies. In this forming process, since the molten glass is not in contact with only one of the dies for a long time, and the temperature of the die, over a period of time until the molten glass is separated from a pair of dies after coming in contact therewith is controlled to be lower than the glass transition point (Tg) of the molten glass, it is not required to attach to the surface of the die a mold release material for preventing the molten glass from being fused to the die. Since the molten glass is not fused to the mold, the surface roughness of the press forming surface can be made extremely small, and the press forming surface is shape-transferred, so that the surface roughness of the glass blank obtained by press forming is extremely small. Therefore, in the scribing process as a subsequent process, a scribe cutter is applied to a smooth principal face having an extremely small surface roughness, and the circularity and concentricity of two concentric-circle-shaped plane-cutting lines formed by the scribe cutter are at an extremely high level. As a result, the circularity and concentricity of the outer shape and the central hole of the glass substrate obtained by scribing become extremely high.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

EXAMPLES

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from a foam and an unmelted substance. A foam and an unmelted substance, deposition of crystals, and contaminants such as a refractory material and platinum forming the melting vessel were not observed in the glass obtained. The glass transition point (Tg) of the resulting molten glass was 150° C.

[Composition of Glass]

Amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion expressed in mol %. A glass transition point (Tg) is 505° C., and a linear expansion coefficient is $80 \times 10^{-7}$/° C.

The above-described molten glass was provided, and a glass blank having a diameter of 75 mm and a thickness of 0.9 mm was prepared using the press forming method described above (method using the apparatus in FIGS. 3 and 4). The temperature of a molten glass material $L_G$ discharged from a molten glass outflow port 111 was 1300° C., and the viscosity of the molten glass material $L_G$ at this time was 700 poise.

The molten glass material $L_G$ discharged from a molten glass outflow port 111 was cut by a cutting unit 160, so that a gob $G_G$ having a thickness of about 20 mm is formed. The gob $G_G$ was pressed under a load of 3000 kgf by a press unit until the gob $G_G$ had a temperature equal to or lower than the glass transition temperature (Tg) of the molten glass material, so that a glass blank having a diameter of 75 mm was formed.

Example 1

In Example 1 illustrated in Table 1, a heat exhausting unit illustrated in E1 of FIG. 8 was provided over the whole area of the forming surface of a die, and press forming was performed. The heat exhausting unit was formed of copper and had a thickness of 30 mm. A die, the forming surface (particularly contact surface that is in contact with a molten glass) of which had a surface roughness (arithmetic surface roughness Ra) of no less than 0.01 μm and less than 0.1 μm, was used. At this time, the maximum temperature of the die, over a period of time until the molten glass was separated from the die after coming into contact with the die, was measured and found to be 495° C. A glass blank obtained after press forming was subjected to scribing (simultaneous formation of ID (an inner hole) and OD (an outer shape)) to obtain a glass substrate having an outer diameter of 65 mm and a central hole diameter of 20 mm.

Example 2

In Example 2 illustrated in Table 1, press forming was performed using a heat exhausting unit similar to that in Example 1. A die, the forming surface of which had a surface roughness of no less than 0.1 μm and less than 0.5 was used. The maximum temperature of the die was measured in the same manner as in Example 1 and found to be 495° C. A glass blank obtained after press forming was subjected to scribing in the same manner as in Example 1 to obtain a glass substrate having an outer diameter of 65 mm and a central hole diameter of 20 mm.

Example 3

In Example 3 illustrated in Table 1, press forming was performed using a heat exhausting unit similar to that in Example 1. A die, the forming surface of which had surface roughness of no less than 0.5 μm and less than 2.0 μm, was used. The maximum temperature of the die was measured in the same manner as in Example 1 and found to be 495° C. A glass blank obtained after press forming was subjected to scribing in the same manner as in Example 1 to obtain a glass substrate having an outer diameter of 65 mm and a central hole diameter of 20 mm.

The surface roughness of the forming surface of the die is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 256×256 pixels in a measurement area of 10 μm×10 μm square was used.

TABLE 1

| | Maximum temperature of die | Presence/ absence of mold release material | Surface roughness of forming surface of die (Ra) | Yield of scribing (%) | Evaluation |
|---|---|---|---|---|---|
| Example 1 | 495° C. | Absent | 0.01 μm or more Less than 0.1 μm | 100 | Very good |
| Example 2 | 495° C. | Absent | 0.1 μm or more Less than 0.5 μm | 99 | Very good |
| Example 3 | 495° C. | Absent | 0.5 μm or more Less than 2.0 μm | 95 | Good |

[Evaluation of Examples]

The evaluation in Table 1 was performed by scribing 100 glass blanks for each Example, and by determining a rate of the number of glass blanks that could be cut into a disk shape without being fractured, or without large breaks or cracks which are not fixed in a subsequent process (yield of scribing). Evaluation criteria were as follows.

Very good: The yield (%) of scribing is 98% or more.
Good: The yield (%) of scribing is no less than 95% and less than 98%.
Fair: The yield (%) of scribing is 90% or more and less than 95%.

In Examples 1 to 3, the surface roughness of the principal face of the glass blank obtained after forming was almost identical to the surface roughness of the forming surface of the mold because a mold release material was not used. It was confirmed that particularly when the surface roughness (Ra) of the forming surface of the mold is 0.5 μm or less, the yield of scribing becomes especially high.

Next, glass (Tg: 630° C., average linear expansion coefficient when a temperature is 100 to 300° C. is $80 \times 10^{-7}/°$ C.) which has a different composition from Examples 1 to 3 was used to perform the same experiment as in Examples 1 to 3 (Examples 4 to 6). The highest temperature of a die was controlled to be 610° C.

The glass composition used in the experiment is as follows.

[Glass Composition in Examples 4 to 6]

Glass material including, as a glass composition expressed in mol %, 56 to 75% of $SiO_2$,
1 to 11% of $Al_2O_3$,
more than 0% and 4% or less of $Li_2O$,
1% or more and less than 15% of $Na_2O$, and
0% or more and less than 3% of $K_2O$, and is substantially free of BaO;
a total content of alkali metal oxides selected from the group consisting of $Li_2O$, $Na_2O$, and $K_2O$ is in a range of 6 to 15%,
a molar ratio of a content of $Li_2O$ to a content of $Na_2O$ ($Li_2O/Na_2O$) is less than 0.50;
a molar ratio of a content of $K_2O$ to the total content of the alkali metal oxides $\{K_2O/(Li_2O+Na_2O+K_2O)\}$ is 0.13 or less;
a total content of alkaline-earth metal oxides selected from the group consisting of MgO, CaO, and SrO is in a range of 10 to 30%;
a total content of MgO and CaO is in a range of 10 to 30%;
a molar ratio of the total content of MgO and CaO to the total content of the alkaline-earth metal oxides $\{(MgO+CaO)/(MgO+CaO+SrO)\}$ is 0.86 or more;
a total content of the alkali metal oxides and the alkaline-earth metal oxides is in a range of 20 to 40%;
a molar ratio of a total content of MgO, CaO, and $Li_2O$ to the total content of the alkali metal oxides and alkaline-earth metal oxides $\{(MgO+CaO+Li_2O)/(Li_2O+Na_2O+K_2O+MgO+CaO+SrO)\}$ is 0.50 or more;
a total content of oxides selected from the group consisting of $ZrO_2$, $TiO_2$, $Y_2O_3$, $La_2O_3$, $Gd_2O_3$, $Nb_2O_5$, and $Ta_2O_5$ is more than 0% and 10% or less; and
a molar ratio of the total content of the oxides to a content of $Al_2O_3$ $\{(ZrO_2+TiO_2+Y_2O_3+La_2O_3+Gd_2O_3+Nb_2O_5+Ta_2O_5)/Al_2O_3\}$ is 0.40 or more.

Yield of scribing in Examples 4 to 6 is as follows.
Example 4: 98%
Example 5: 97%
Example 6: 93%

Furthermore, glass (Tg: 680° C., average linear expansion coefficient when a temperature is 100 to 300° C. is $80 \times 10^{-7}/°$ C.) which has a different composition from Examples 1 to 3 was used to perform the same experiment as in Examples 1 to 3 (Examples 7 to 9). The highest temperature of a die was controlled to be 660° C.

The glass composition used in the experiment is as follows.
[Glass Composition in Examples 7 to 9]
Glass material including, as a glass composition expressed in mol %,
- 50 to 75% of $SiO_2$,
- 0 to 5% of $Al_2O_3$,
- 0 to 3% of $Li_2O$,
- 0 to 5% of ZnO,
- 3 to 15% in total of $Na_2O$ and $K_2O$, and
- 14 to 35% in total of MgO, CaO, SrO, and BaO, and
- 2 to 9% in total of $ZrO_2$, $TiO_2$, $La_2O_3$, $Y_2O_3$, $Yb_2O_3$ $Ta_2O_5$, $Nb_2O_5$ and $HfO_2$, a molar ratio [(MgO+CaO)/(MgO+CaO+SrO+BaO)] is in a range of 0.8 to 1, and a molar ratio [$Al_2O_3$/(MgO+CaO)] is in a range of 0 to 0.30.

Yield of scribing in Examples 7 to 9 is as follows.
Example 7: 97%
Example 8: 96%
Example 9: 91%

As seen from comparison of Examples 1 to 3 and Examples 4 to 9, the yield was decreased when Tg of the glass was increased. As a cause of this had been investigated, a break or a crack was found to be occurred on the OD side. Furthermore, a stress strain in a sheet thickness direction of a glass blank was examined by use of a Babinet method, and a stress strain was found to be occurred on the OD side. Then, a depth of a cutting line on both of the ID side and the OD side was made to be 0.1 mm by applying a pressing force applied to the OD side 1.2 times higher than that applied to the ID side in the scribing process, and the same evaluation as in Examples 4, 5, 7, and 8 was performed. Consequently, yield was improved and was 98% or more in all Examples.

Next, yield of scribing was evaluated by using a glass blank made of the glass used in each Example with dies, each having different surface roughness. The result is shown in Table 2 below. Consequently, it has been found that the highest yield can be obtained when the surface roughness of a die is 0.1 µm or less.

TABLE 2

| Surface roughness of forming surface of die (µm) | Glass used in Examples 1 to 3 | Glass used in Examples 4 to 6 | Glass used in Examples 7 to 9 |
| --- | --- | --- | --- |
| 0.01 to 0.1 | 100% | 98% | 97% |
| 0.1 to 0.5 | 99% | 97% | 96% |
| 0.5 to 2.0 | 95% | 93% | 91% |

The embodiments of the present invention have been described in detail, but the method for manufacturing a glass substrate for magnetic disk according to the present invention is not limited to the aforementioned embodiments, and it is needless to say that various modifications and changes may be made without departing from the spirit of the present invention.

What is claimed is:

1. A method for manufacturing a glass substrate for magnetic disk, the method comprising:
   a forming process of forming a disk-shaped glass blank by direct-pressing a molten glass by a pair of dies, wherein press forming is performed while the temperature of the pair of dies, over a period of time until a molten glass is separated from the die after coming into contact with the die, is set at a temperature lower than a glass transition point (Tg) and a mold release material is not attached to the surfaces of the pair of dies; and
   a shape processing process including:
      scribing an outside concentric circle and an inside concentric circle on the principal face of the disk-shaped glass blank to form two-concentric-circle shape cutting lines, and
      growing the circular cutting lines by partially heating the disk-shaped glass blank so that a portion outside the outside concentric circle and a portion inside the inside concentric circle are removed due to a difference in thermal expansion of the disk-shaped glass blank to form a ring-shaped glass substrate, wherein a pressing force applied to a cutting line for the outside concentric circle is higher than a pressing force applied to a cutting line for the inside concentric circle.

2. The method for manufacturing a glass substrate for magnetic disk according to claim 1, wherein the arithmetic mean roughness (Ra) of contact surfaces of the pair of dies that are in contact with the molten glass is 0.5 µm or less.

3. The method for manufacturing a glass substrate for magnetic disk according to claim 2, wherein the arithmetic mean roughness (Ra) of the contact surfaces is 0.1 µm or less.

4. The method for manufacturing a glass substrate for magnetic disk according to claim 1, wherein in the forming process, a falling lump of molten glass is press-formed in a direction orthogonal to a falling direction using the pair of dies.

5. The method for manufacturing a glass substrate for magnetic disk according to claim 1, wherein, in the forming process, press forming is performed so that the temperature of portions of the pair of dies, each contacts the molten glass, is substantially identical.

6. The method for manufacturing a glass substrate for magnetic disk according to claim 1, wherein in the shape processing process, the outside concentric circle and the inside concentric circle are scribed at the same time.

* * * * *